Figure 1:
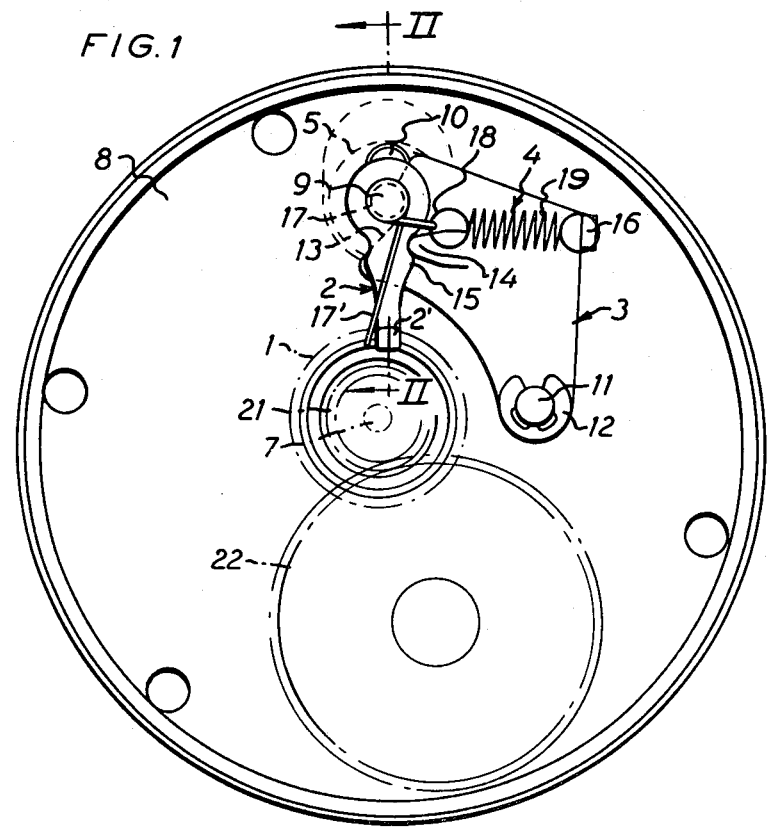

United States Patent [19]

Karlsson et al.

[11] 4,088,279
[45] May 9, 1978

[54] CLICK SIGNAL DEVICE FOR A FISHING REEL

[75] Inventors: Jarding Urban Karlsson; Gerth Karl Anders Blomgren, both of Svangsta, Sweden

[73] Assignee: ABU Aktiebolag, Svangsta, Sweden

[21] Appl. No.: 729,650

[22] Filed: Oct. 5, 1976

[30] Foreign Application Priority Data

Oct. 6, 1975 Sweden .............................. 7511154

[51] Int. Cl.$^2$ ............................................. A01K 89/00
[52] U.S. Cl. ............................ 242/84.1 R; 74/577 R; 116/115
[58] Field of Search ............ 242/84.1 R, 84.51 R, 242/219, 212, 217; 74/577 R, 575; 116/115

[56] References Cited

U.S. PATENT DOCUMENTS

| 2,633,308 | 3/1953 | Zientowski | 242/84.51 R |
| 3,827,649 | 8/1974 | Payen | 242/84.1 R |

FOREIGN PATENT DOCUMENTS

2,206 of 1909 United Kingdom .......... 242/84.51 R

*Primary Examiner*—Billy S. Taylor
*Attorney, Agent, or Firm*—Karl W. Flocks

[57] ABSTRACT

This invention relates to a click signal device for a fishing reel, said device comprising a toothed wheel, a click signal producing pivotable pawl, a return spring mechanism and a pivotable lever. The pawl is pivotable by the action of the toothed wheel in opposite directions from an intermediate position against the action of the spring mechanism. When pivoted in one directon from its intermediate position, the pawl acts directly against the return spring mechanism and is also returned directly thereby but, when pivoted in opposite direction from said intermediate position, the pawl will act against the spring mechanism through the lever and will be returned by the spring mechanism via the lever, whereby a compact spring mechanism can be used and different click signal characters be produced in one and the other direction of rotation of the toothed wheel.

6 Claims, 2 Drawing Figures

U.S. Patent

May 9, 1978

4,088,279

CLICK SIGNAL DEVICE FOR A FISHING REEL

The present invention relates to a click signal device for a fishing reel.

Click signal means for fishing reels are, as is well known, designed to inform the fisherman that the spool rotates driven by the crank or by the fishing line. The click signal device usually consists of a tooth wheel and a spring-biased pawl which in engaged position, bears against the tooth wheel and, during rotation of the tooth wheel, snaps into the gaps between the teeth, thus producing the so-called click signal. The tooth wheel may appear in various embodiments and instead of a tooth wheel use may be made of, for instance, a circular succession of projections, recesses or notches on a rotary member, and the so-called click pawl, which usually is carried on a stationary part of the fishing reel, need not necessarily be in the conventional form of a ratchet type pawl but may consist of, for instance, a spring leaf, a spring-biased button or knob, a piston or like means.

The invention primarily concerns the type of click signal devices which include a tooth wheel adapted for rotation with the spool and a spring-biased click pawl which is carried on the inside of an end wall of the fishing reel and is shiftable between a disconnected and a connected position by means of a knob located so as to be accessible from the outside of the end wall, and the object of the invention is to provide a functionally reliable double-acting click signal device, i.e. a device which, in connected position, is operative in both directions of rotation of the tooth wheel and is of simple, compact and functionally reliable design.

This object is realized by the click signal device according to this invention, wherein the click pawl is pivotable from an intermediate position in one direction by the tooth wheel against the action of a return spring mechanism which then returns the click pawl, and is pivotable from said intermediate position in the opposite direction by the tooth wheel to act against the return spring mechanism by pivoting a pivotally mounted lever which is kept engaged against the click pawl by means of the spring mechanism.

Other characteristic features of the invention will appear from the following description and claims.

Figure 2:
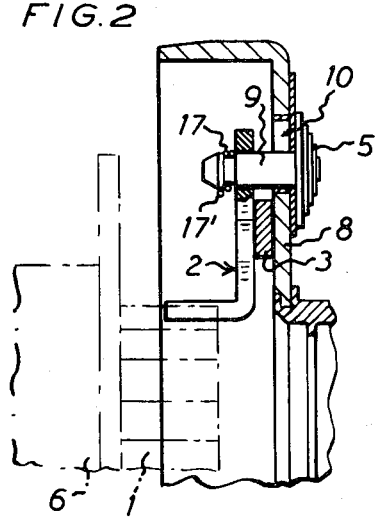

The invention will be described in more detail below with reference to the accompanying drawing in which:

FIG. 1 is a plan view of the inside of an outer end wall disassembled from the spinning reel and on which there is mounted a click pawl means forming a click signal means in combination with a tooth wheel, indicated by dot and dash lines, which is fixed on the shaft of a line spool; and FIG. 2 is a cross-section taken along line II—II of FIG. 1.

The click signal means of this invention comprises a tooth wheel 1 which, due to its function, is usually called "click wheel", a click pawl 2 designed to cooperate with the click wheel 1, a click lever 3 designed to cooperate with the click pawl, a spring mechanism 4 and a control button or knob 5 for shifting the click signal means between active and inactive positions.

The click wheel 1 is mounted on the shaft 7 of the line spool 6 (the shaft 7 and other per se known details being merely indicated by dash-dotted lines) and the other elements 2–5 of the click signal device are mounted on an end wall 8 of the fishing reel, in this case the left-hand end wall; the click pawl 2, the click lever 3 and the spring mechanism 4 being mounted on the inside of the end wall 8 while the control knob 5 is mounted on the outside of the end wall.

The click pawl 2, which is L-shaped in the preferred embodiment illustrated in the drawing, is pivotally mounted on a pivot 9 which extends through an oblong aperture or slot 10 in the end wall 8 and carries the control knob 5 at its outer end, i.e. on the outside of the end wall 8. The pivot 9 is displaceable by means of the knob 5 in the longitudinal direction of the slot 10 for moving the click pawl 2 between an outer, inactive position as indicated by broken lines in FIG. 1 and an inner position, indicated by full lines, to engage the click wheel 1. In each of these positions the click pawl is releasably retained by means of a cam member which will be described below in conjunction with the description of the click lever 3.

The click lever 3 is in the form of a plate shaped as a bell crank and is at one end pivotally mounted on a pin 11 which at one end is fixed in an aperture in the end wall 8. The lever 3 is axially fixed on the pin 11 by means of a C-shaped lock washer 12 engaging a groove on the pin. The lever 3 is at its opposite end provided with a recess 13 embracing the pivot 9 in a space between the outer end wall 8 and the click pawl 2 and has a tongue 14 which at its base projects from the plane of the lever 3 and then extends in parallel therewith for engaging the adjoining side edge of the click pawl 2. This side edge is in the form of a cam surface having depressions on either side of a cam projection 15 in order to retain the click pawl 2 in its two positions in cooperation with the tongue 14 on the click lever 3 and the spring mechanism 4.

The spring mechanism 4 comprises a tension spring 19 which is clamped between the pivot 9 and a spring bracket 16 at a point on the lever 3 so located that the spring tends to keep the lever 3 in a position where the tongue 14 bears against the adjoining side edge of the click pawl 2.

In the preferred embodiment shown in the drawing the spring 19 is connected with the pivot 9 via a second spring 17 which, like the tension spring 19, is in the form of a helical spring but is mounted on an end portion of the pivot 9 projecting from the click pawl 2. One end of the second spring 17 is connected with one end of the first spring 19, as shown at 18, and the other end of the spring 17 is prolonged to form a spring leg 17' which extends along the pawl 2 and is so located that its outer end bears against the inturned end portion 2' of the generally L-shaped pawl 2 which is designed to engage the click wheel 1. Thus, the pawl 2 and the lever 3 are kept together by means of the springs 17, 19 and are movable jointly but also movable relative to each other, and the springs 17, 19 balance each other in their action upon the click pawl 2 so that they tend to hold the pawl 2 in an intermediate position between its maximum angular deflections in opposite directions during the rotation of the click wheel 1 in opposite directions. From the position indicated by full lines in FIG. 1, where the pawl 2 engages the click wheel 1, the pawl 2 can be pivoted by means of a tooth of the click wheel against the spring mechanism 4 and then be returned by the latter independently of the direction of rotation of the line spool 6. When the line spool and thus the click wheel 1 is rotated in counter-clockwise direction, the pawl 2 will be pivoted in clockwise direction against the action of the spring leg 17' and returned by the spring leg. Under this condition the lever 3 remains immobile, resting against the pivot 9. The click wheel 1 can also be rotated in clockwise direction, since the pawl 2 permits such rotation and will be pivoted thereby in counter-clockwise direction, also now against the action of the spring 19, but because of the fact that the click pawl at each pivotal movement in the latter direction will act as a lever upon the click lever 3 by its contact with the tongue 14, thereby pivoting the click lever 3 in clockwise direction about the pin 11 and thus extending the spring 19 which then will return the click lever 3 and thereby the click pawl 2 to the intermediate position shown in FIG. 1. Thus, the click wheel 1 in rotation in each direction will, in cooperation with the spring mechanism, bring the click lever 3 to effect a reciprocatory pivotal movement.

When the knob 5 is moved to its radially outward position to displace the click pawl 2 into inactive position, the end of the tongue 14 slides on the edge or cam surface of the pawl 2 from one of the depressions therein, where it is shown in engagement in FIG. 1, along the projection 15, and applies itself against the other depression in the edge of the pawl 2 below the projection 15 as seen in FIG. 1, and will then retain the pawl in the new position. The movement of the tongue 14 over the projection 15 takes place against the action of the spring 19, and the tongue and the spring 19 will also enable the click pawl to be held in two stable positions.

The arrangement described above achieves the following advantages.

The spring system requires little space considering its fourfold action, viz. 1) action in one direction of rotation of the click pawl, 2) action in the opposite direction of rotation of the click pawl, 3) and 4) action as a retaining spring for the click pawl in its engaged and disengaged positions. Moreover, the spring system may be attributed a fifth action since, with different characters of the two springs 4, 19 (and due to the described pivotal movement of the click pawl 3 during rotation of the line spool 6 and the click wheel 1 in one direction) it is possible to produce different click sounds in the two directions of rotation of the line spool, and this may be advantageous. Another advantage is that the elements of the signal means which consist of the pawl 2, the lever 3 and the spring system 4, 17 requires little space in the circumferential direction of the end wall 8. Considering the space required by the device according to this invention it should be noticed that the shaft 7 of the line spool 6 is not exactly coaxial with the center of the end wall 8 but is somewhat displaced upwardly in FIG. 1 to provide space for a gear wheel transmission 21, 22 the function of which has no direct relation to the function of the click signal means, and it should also be noted that the size of the lever 3 shown in FIG. 1 can readily be reduced if desired.

The device according to the invention also is easy to assemble. The pawl 2 is axially fixed on the pivot 9 by means of the spring 17 and the pin 11 is axially fixed by means of the washer 12.

The device according to the invention is of course not constricted to the configuration of the pawl 2, the lever 3 and the spring system 4 illustrated in the drawing and as described in detail above.

What we claim and desire to secure by Letters Patent is:

1. A click signal device for a fishing reel, comprising a rotary tooth wheel, a pivotable click pawl which is movable between an inactive position and an active signal-producing position out of and into engagement with the tooth wheel, a control member positioned accessible from the outside of the reel and connected to the click pawl for moving said pawl between said positions, and a spring mechanism connected with the click pawl for holding it engaged with the tooth wheel in the active position of the pawl to enable the pawl to be pivoted and for returning the pawl after pivoting thereof by the action of the tooth wheel, wherein the click pawl is pivotable in one direction from an intermediate position by rotation of the tooth wheel in one direction against the action of the spring mechanism which then returns the click pawl and is pivotable in the opposite direction from said intermediate position by rotation of the tooth wheel in the opposite direction, and a pivotally mounted lever connected to said spring mechanism and held in engagement with the click pawl by means of said spring mechanism, the click pawl, when being pivoted in said opposite direction, will act against said spring mechanism through said lever and will then be returned by the action of said spring mechanism on said lever.

2. A device as claimed in claim 1, in which said control member comprises a pivot and said click pawl is pivotally mounted on said pivot which, to permit shifting of the click pawl between its active and inactive positions, is movable in a guide means which is substantially radial relative to the tooth wheel, wherein said lever in said intermediate position of the pawl rests on the pivot and has a projection engaging the click pawl, said lever being pivotable from this position by the action of the click pawl against said projection when the click pawl is pivoted in said opposite direction.

3. A device as claimed in claim 2, wherein the spring mechanism comprises a first spring member acting between the pivot and a point on the click pawl, and a second spring member acting between the lever and the pivot.

4. A device as claimed in claim 3, wherein the two spring members are two separate springs, one of which is mounted on the pivot and the other is connected with the pivot via the first-mentioned spring, and said two springs are arranged to balance each other in their action on the click pawl and tend to hold the click pawl in said intermediate position from which the click pawl is pivotable in opposite directions by the action of the tooth wheel during the rotation of the latter in opposite directions.

5. A device as claimed in claim 4, wherein one of said springs has a spring leg which acts directly upon the click pawl, an intermediate portion which forms a loop around the pivot and an end portion connected with one end of the other spring, said other spring being a tension spring attached with its other end to said lever.

6. A device as claimed in claim 2, wherein the spring mechanism and the lever are adapted to cooperate with the click pawl for producing different characters of click sound during rotation of the tooth wheel in opposite directions of rotation.

* * * * *